May 27, 1930.  J. N. TARPLEY  1,759,921
VESSEL FOR SUBMERGED BAKING OF PIES

Filed March 25, 1929

INVENTOR
James N. Tarpley,
BY
ATTORNEY

Patented May 27, 1930

1,759,921

UNITED STATES PATENT OFFICE

JAMES N. TARPLEY, OF OKLAHOMA CITY, OKLAHOMA

VESSEL FOR SUBMERGED BAKING OF PIES

Application filed March 25, 1929. Serial No. 349,558.

My invention relates to vessels for submerged baking of pies.

The objects of my invention are to provide a device of this class which will be new, novel, practical, and of utility; which will allow the cooking of pies in deep grease without saturating the crust with said grease; which will cause the pie to bake uniformly throughout; which will not lengthen the usual cooking time; which will separate a pie into uniform equal sections; which may be cheaply manufactured; which will be durable; which will prevent the fruit and the like in a pie from escaping from its crust and mixing with the cooking grease; which will save cooking oil or grease; which will be efficient in accomplishing all of the purposes for which it is intended.

At the present time what is known in the art as "fried pies", are made by placing a crust over the bottom of a common pie pan, filling one half of the pan with the desired fruit and the like, then turning the empty half of the crust back over said fruit, thus forming a top and bottom crust for said fruit. The edges of the crusts are then crimped or pressed together over the edge of the pan. The pie thus formed is then placed in a container, usually a wire basket which holds several pies, and lowered into the hot grease for cooking. Many of the pies lying together loosely in said basket become broken or punctured, which allows the fruit to escape into the cooking oil. This necessitates the frequent changing of the oil at considerable expense. In the present method the crust of the pies becomes saturated with the cooking oil which makes them less appetizing than if only a small amount of oil was absorbed. The pies are seldom of a uniform shape or size or uniformly baked.

In using my invention the finished pies are of uniform shape and size, the crust only has a small amount of the cooking oil therein. The invention overcomes all of the impractical features of the present method as well as accomplishing new and novel results of its own.

Figure 1:
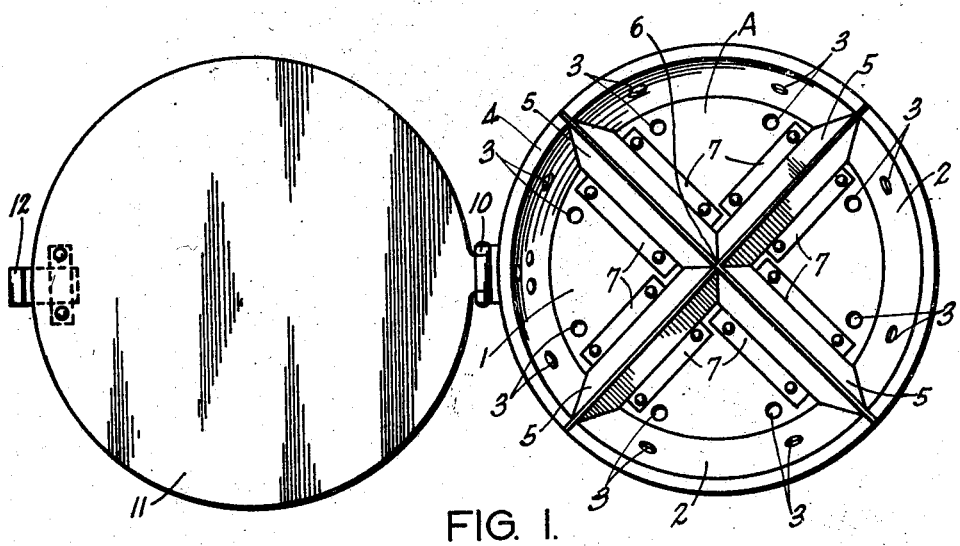
Figure 2:
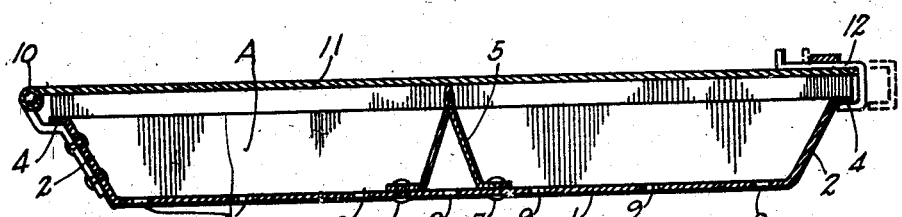
Figure 3:
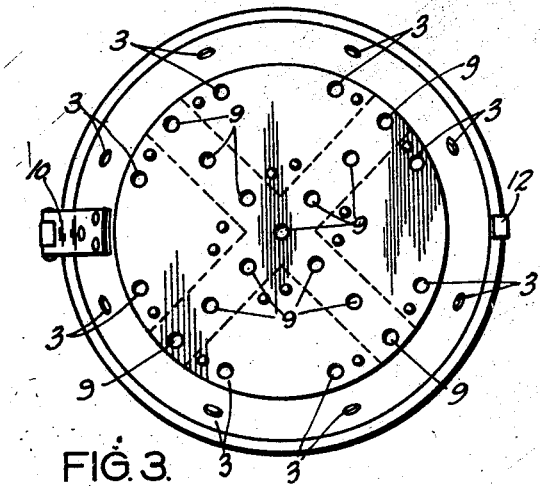
Figure 4:
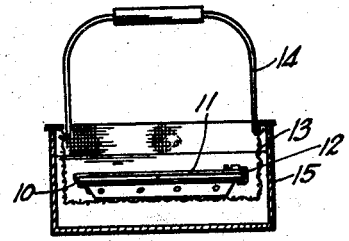

With these and other objects in view as will more fully appear my invention consists in the construction, novel features, and combination of parts hereinafter more fully described, poined out in the claims hereto appended, and illustrated in the accompanying one-sheet drawing, of which, Figure 1 is a plan view showing the pan open; Fig. 2 is a sectional view through the device showing the lid closed; Fig. 3 is a bottom view showing perforations; Fig. 4 is a sectional view through a cooking oil container showing my device submerged in a wire basket.

Like characters of reference designate like parts in all the figures.

It is understood that various changes in the form, proportion, size, shape, weight and other details of construction, within the scope of my invention may be resorted to without departing from the spirit or broad principle of my invention and without sacrificing any of the advantages thereof; and it is also understood that the drawings are to be interpreted as being illustrative and not restrictive.

A practical embodiment of the invention as illustrated in the drawings follows:

I provide a pan or vessel A, made of any suitable material such as metal, glass, and the like and any suitable shape such as square, rectangular and the like, but preferably to be circular. Said pan having a bottom 1 and annular sides 2 sloping upwardly and outwardly from said bottom 1. Said pan A having therethrough a plurality of perforations 3 for allowing heat and oil more freely to enter said pan. At the upper edge of said sides 2 is formed flat angular lip 4. Within said pan and dividing it into four equal parts, are upright hollow portions 5. Said partitions 5 are substantially of the shape of an inverted letter V, and extend upwardly slightly past the level of said lip 4. As may be seen in Fig. 1, said partitions extend longitudinally across said pan A between the outer edges of said lip 4 at right angles with each other, and meet at a point shown as 6 adjacent the center of said pan A. Said partitions 5 for illustrative purposes are shown as having flanges 7 and as being riveted into position, but may be, when the device is made of metal, attached by any usual means such as spot welding and the like. When said device is made of glass, and the like, said partitions may be made of the same material and integral therewith. Through the bottom of said pan A and beneath the open portions 8 beneath said partitions 5 I provide a plurality of perforations 9, which may better be seen in Figs. 2 and 3. Said perforations 9 are for the purpose of allowing the cooking oil to enter beneath said partitions 5 to facilitate the baking of the pies. I do not wish to be bound as to shape or size of said perforations 9 beneath said partitions 5 and it is to be understood that I may, if desired, entirely do away with the portions of said bottom lying beneath said partitions 9. At a point adjacent the upper edge of said side 2 I provide hinge 10 which extends upwardly to a height the same as the top of said partitions 5, and which may be riveted to said vessel as illustrated, or attached by any usual means. Operatively connected to said hinge 10 is top 11 which is approximately circumferentially of the same size as said lip 4. Said top 11 is provided with catch or detent 12 for fastening said top in a closed manner.

In operation, the bottom pie crust is placed in the pan in the usual manner. The fruit is then placed on the crust in each compartment, and covered with the usual top crust, and the lid 11 closed and fastened by catch 12. It will be seen that the closing of said lid 11 will press both crusts together upon the upper edges of said partitions 5 and upon the upper surface of said lip 4. This relieves the baker from the necessity of crimping the two crusts together at their edges as is usually necessary thereby saving time, and at the same time divides the pie into four separate pieces. The device is then placed in the usual wire basket 13 with bail 14, better seen in Fig. 4 and lowered into the hot cooking oil in any container shown as 15. When the hot oil comes in contact with the cold pie crust at the exposed edges between said lip 4 and said top 11 and at said perforations 3, the crust immediately expands and fills said perforations and said space thus forming a barrier which prevents the oil from saturating the entire crust, but does not prevent the heat from entering said perforations. Only a slight portion soaks into the crust. The oil enters said perforations 9 beneath said partitions 5, and the heat from the oil upon the pan bakes rather than fries the pie. When the pie is baked, the crust is light and brittle and when taken from the pan is readily broken into four uniform pieces along the lines caused by said partitions 5, by simply pressing on the top 11.

Obviously, the invention is susceptible of embodiment in forms other than that which is illustrated in the accompanying drawings and described herein, and applicable for the uses and purposes other than as detailed, and I therefore consider as my own all such modifications and adaptations and other uses of the form of the device other than as herein described as fairly fall within the scope of my invention.

Having thus described my invention what is claimed and desired to be secured by Letters Patent, is:

1. A device, as described, embodying, a circular plurally perforated pan for baking pies in deep oil, having integral crossed wedge-shaped hollow partitions for separating said pies into four equal parts, a flat hinged lid adapted to be closed over said pan in spaced relation thereto, said space and said perforations for permitting the circulation of oil for facilitating the baking of said pies.

2. A device, as described, embodying, a circular plurally perforated pan for baking pies in deep oil, hollow crossed open bottomed wedge-shaped partitions integrally disposed within said pan for separating said pies into four equal parts, a flat hinged lid adapted to close over said pan in spaced relation thereto, said space and said perforations for facilitating said baking.

3. A device, as described, embodying, a circular, plurally perforated pan for baking pies in deep oil, hollow crossed open bottomed wedge-shaped partitions within said pan for separating said pies into four equal parts, a flat hinged lid adapted to close over said pan and to be held in spaced relation thereto by a catch, said space and said perforations for facilitating said baking.

4. A device, as described, embodying, a circular plurally perforated pan for baking pies in deep oil, crossed wedge-shaped hollow open bottomed partitions within said pan for separating said pies into four equal parts, said partitions meeting adjacent the center of said pan, a flat hinged lid adapted to be closed over said pan, and to be held in spaced relation thereto by a catch for holding said lid closed, said space and said perforations for permitting the circulation of oil for facilitating said baking.

5. A device, as described, embodying, a circular plurally perforated pan for baking pies in deep oil, crossed wedge-shaped hollow partitions rigidly disposed within said pan for separating said pies into four equal parts, said partitions extending upward slightly above the sides of said pan, and meeting adjacent the center of said pan, a flat hinged lid for said pan, said lid having a sliding catch for holding it closed.

6. A device, as described, having in combination a circular, plurally perforated pan for baking pies in deep oil, crossed open bottom wedge shape hollow partitions rigidly disposed within said pan for dividing it into four equal sections, said partitions extending upward slightly above the sides of said pan, and meeting adjacent the center of said pan, a flat hinged lid adapted to close over said pan and to rest upon said partitions and to be held thereon by a catch, said partitions holding said lid in spaced relation to the sides of said pan for permitting the circulation of oil thereinto for facilitating baking.

JAMES N. TARPLEY.